United States Patent [19]

Liaklev

[11] Patent Number: 5,934,003
[45] Date of Patent: Aug. 10, 1999

[54] METHOD AND BAITING MACHINE FOR BAITING FISHING HOOKS

[75] Inventor: Geir Jørn Liaklev, Gjøvik, Norway

[73] Assignee: O. Mustad & Son A/S, Gjøvik, Norway

[21] Appl. No.: 08/981,875
[22] PCT Filed: May 5, 1997
[86] PCT No.: PCT/NO97/00116
    § 371 Date: Jan. 5, 1998
    § 102(e) Date: Jan. 5, 1998
[87] PCT Pub. No.: WO97/41725
    PCT Pub. Date: Nov. 13, 1997

[30] Foreign Application Priority Data

May 6, 1996 [NO] Norway ..................... 961829

[51] Int. Cl.⁶ .......................... A01K 31/06; A01K 69/00
[52] U.S. Cl. ............................................. 43/4; 43/4.5
[58] Field of Search ............................................. 43/4, 4.5

[56] References Cited

U.S. PATENT DOCUMENTS

| | | | |
|---|---|---|---|
| 2,511,828 | 6/1950 | Andrist | 43/4 |
| 2,518,590 | 8/1950 | Andrist | 43/4 |
| 2,670,556 | 3/1954 | Hopkins et al. | 43/4 |
| 2,846,803 | 8/1958 | Rettig | 43/4 |
| 3,387,401 | 6/1968 | Stelmach | 43/4 |
| 3,841,011 | 10/1974 | Tison | 43/4 |
| 3,997,996 | 12/1976 | Nygaard | 43/4 |
| 4,015,359 | 4/1977 | Andrews | 43/4 |
| 4,437,254 | 3/1984 | Fancey et al. | 43/4 |
| 4,477,992 | 10/1984 | Lang et al. | 43/4 |
| 4,486,967 | 12/1984 | Fancey et al. | 43/4.5 |
| 4,567,684 | 2/1986 | Bjorshol | 43/4 |
| 4,638,583 | 1/1987 | Bjorshol | 43/4 |
| 4,641,452 | 2/1987 | Bjorshol | 43/4 |
| 4,648,493 | 3/1987 | Alex et al. | 43/4 |
| 4,704,815 | 11/1987 | Poirier et al. | 43/4 |
| 4,750,285 | 6/1988 | Cook, Jr. | 43/4 |
| 4,787,165 | 11/1988 | Cook, Jr. | 43/4 |
| 4,858,362 | 8/1989 | Cook, Jr. | 43/4 |
| 4,896,449 | 1/1990 | Hopper | 43/4 |

FOREIGN PATENT DOCUMENTS

| | | | |
|---|---|---|---|
| 470991 | 1/1951 | Canada | 43/4 |
| 470993 | 1/1951 | Canada | 43/4 |
| 814132 | 6/1969 | Canada | 43/4 |
| 973709 | 9/1975 | Canada | 43/4 |
| 1049781 | 3/1979 | Canada | 43/4 |
| 1153551 | 9/1983 | Canada | 43/4 |
| 16974 | 2/1913 | Denmark | 43/4 |

(List continued on next page.)

Primary Examiner—Kurt Rowan
Assistant Examiner—Fredrick T. French, III
Attorney, Agent, or Firm—Jacobson, Price, Holman & Stern, PLLC

[57] ABSTRACT

A method for baiting fishing hooks by a baiting machine including a baiting station, wherein fishing hooks are pulled past the baiting station by a line which is attached in the hook's eye. The method includes the steps of threading bait at a first end section thereof, bringing the point of the hook into engagement with a second end section of the bait opposite the first end section during an introductory threading of the hook on to the bait, rotating the bait in a first direction about the spike under the influence of the force exerted on the bait by the hook, while the hook simultaneously continues to be threaded on the bait, and rotating the hook in a direction opposite to the first direction by pulling it off the line, until the bait has been threaded on to the bend of the hook. The invention also relates to a baiting machine for implementation of the method. The baiting machine includes a base on which the shank of the hook can slide, a bait holder with a support side which faces in the pulling direction of the hook, and a holding arm which can be resiliently pressed against the support side. From the section of the support side which faces away from the base, a spike projects towards the holding arm, on which spike the bait can be impaled.

3 Claims, 1 Drawing Sheet

FOREIGN PATENT DOCUMENTS

| | | | |
|---|---|---|---|
| 20299 | 7/1915 | Denmark | 43/4 |
| 1115902 | 1/1956 | France | 43/4 |
| 2455707 | 7/1975 | Germany. | |
| 76025 | 12/1949 | Norway | 43/4 |
| 92762 | 11/1958 | Norway | 43/4 |
| 92763 | 11/1958 | Norway | 43/4 |
| 116942 | 6/1969 | Norway | 43/4 |
| 634965 | 3/1950 | United Kingdom | 43/4 |
| 682421 | 11/1952 | United Kingdom | 43/4 |
| 1116059 | 6/1968 | United Kingdom | 43/4 |
| 1211901 | 11/1970 | United Kingdom | 43/4 |
| 2245469 | 1/1992 | United Kingdom | 43/4 |

METHOD AND BAITING MACHINE FOR BAITING FISHING HOOKS

A baiting machine of this type is known in the prior art, in which the angle at which the bait is rotated during the baiting is defined only by the angle at which the holding arm is rotated. If the baiting machine is used for baiting circular hooks, i.e. hooks whose pointed section is terminated by a point which projects substantially perpendicularly to the shank of the hook, the bait is not rotated far enough to enable it to be satisfactorily threaded into the hook, i.e. after the baiting is completed it abuts against the bend near the shank. The baiting is therefore not completed when the hooks leave the baiting machine, with the result that the bait is not secured or can work loose from the hook after the hook has left the baiting machine.

Furthermore, baiting machines are known with complicated, separate devices for forcibly rotating the hook during baiting. Moreover, these known baiting machines have devices which flatten the bait in order to make it pass between the point of the hook and the shank, a process which can destroy the bait. Since these devices are complicated, they are subject to failure and malfunctioning, thereby increasing the cost of the production, operation and maintenance of the baiting machine.

The object of the invention is to provide a baiting machine which is not encumbered by the above-mentioned disadvantages.

The invention will now be described in more detail with reference to the drawing which schematically illustrates an embodiment of a baiting machine according to the invention.

In connection with the figures, the terms up and down should be understood to refer to the direction towards the edge of the page which faces away from and towards the reader respectively.

Figure 1:
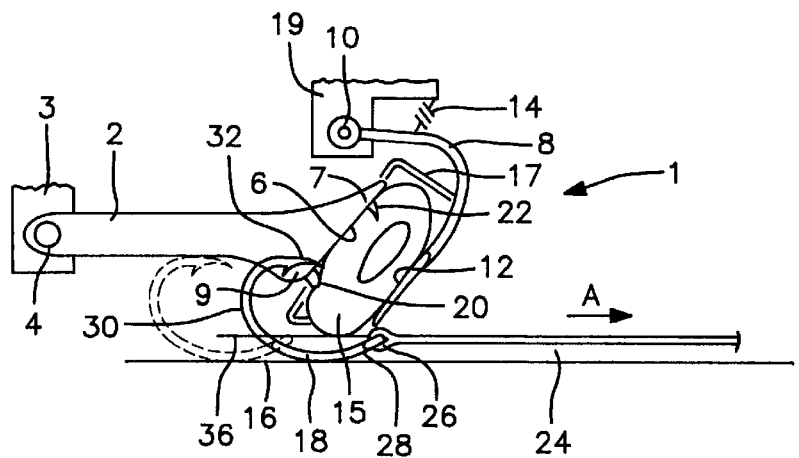
FIG. 1 is a side view of a baiting station of a baiting machine, where sections of the baiting machine are omitted.

As illustrated in FIG. 1, a baiting station 1 comprises an elongated bait holder 2 which is mounted near its left end in a stationary part 3 of the baiting machine, thus enabling the bait holder 2 to pivot about an axis 4. At the right end of the bait holder it has a support side 6 which in the figure extends obliquely in relation to the bait holder's longitudinal direction.

At a first section 7 of the bait holder 2 located at the upper end of the support side 6, the bait holder 2 has a spike 22 which projects away from the support side 6. At a second section 9 of the bait holder 2 located at the lower end of the support side 6, the bait holder 2 has a pin 20 which projects away from the support side 6. The free end of the pin 20 is blunt, while the free end of the spike 22 is sharp.

Moreover, the baiting machine has a curved holding arm 8 which is similarly mounted near its upper end in a stationary part 19 of the baiting machine, thus enabling the holding arm 8 to pivot about an axis 10. At the lower end of the holding arm there is provided a contact surface 12 which is arranged to face the support side 6. A pressure spring 14 attempts to move the holding arm clockwise about the axis 10 in relation to the stationary part 19.

Between the support side 6 and the contact surface 12 there is placed a bait 15 which is held by the contact surface 12 against the support side 6.

Under the bait holder 2 and the holding arm 8 there extends substantially in the bait holder's longitudinal direction a plate 16 which forms a base on which a fishing hook 18 can be pulled past the bait holder 2 and the holding arm 8 by means of a snood 24 which is attached to a line (not shown).

It should be understood that the bait 15, e.g., has been separated from a larger piece of bait by means of a known cutting device (not shown) and placed between the support side 6 and the surface 12 via a channel 17 of a known bait transport device, since, before the bait 15 is affixed, the bait holder 2 and the holding arm 8 can be pivoted to respective different positions from those which are illustrated in the figures and back to the position which is illustrated in FIG. 1 after the bait has been affixed in the correct position.

The fishing hook 18 has an eye 26 in which the snood is secured, a shank 28, a bend 30 and a pointed section 32, which extends substantially perpendicularly to the shank 28.

Furthermore, between the bait holder 2 and the plate 16 there extend two support plates 36 which are arranged to support the bait, and which extend at a distance apart from each other considered across the hook's direction of movement which is indicated by the arrow A, this distance being greater than the thickness of the hook's rod material, thus enabling the hook 18 to pass between the support plates 36 when it is moved past the baiting station. The distance is, however, smaller than the hook eye 26, with the result that the support plates 36 ensure that the hook eye 26 is not moved upwards past them. The support plates 36 are terminated near the point where the lower end of the holding arm 8 is located when the holding arm is in the position which is illustrated in FIG. 1.

The baiting machine's mode of operation is as follows.

After the bait 15 has been placed between the support side 6 and the contact surface 12 by returning the holding arm 8 towards the support side 6 to the position which is illustrated in FIG. 1, the spike 22 is pressed into an upper section of the bait 15, while the pin 20 is pressed against the bait's surface near a lower section of the bait 15, thus tightening the surface of the bait at the pin 20.

In FIG. 1 a hook is illustrated by dotted lines in a position before it has been pulled into the bait.

Figure 2:
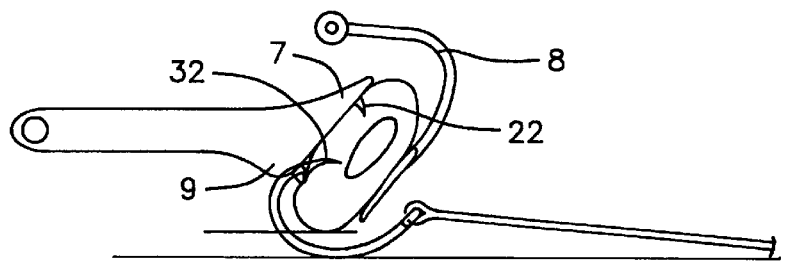
FIGS. 2–4 are views similar to that in FIG. 1, showing different stages during the baiting of a fishing hook, further sections of the baiting machine being omitted.

By exerting a tractive force in the snood 24 in the direction of the arrow A, the hook is moved to the right from the position of the hook 18 illustrated by dotted lines until the pointed section 32 abuts against the bait near the pin 20. Since the pointed section 32 extends perpendicularly to the shank 28, the side of the pointed section comes into abutment against the bait 15, thereby causing the hook 18 to be braked by the bait 15 and the tractive force in the snood 24 increases. The tractive force and the braking force thereby create a torque which attempts to rotate the hook 15 anticlockwise, e.g. to the position which is illustrated in FIG. 2. This rotation is now possible since the hook eye 26 has passed the right end of the support plates 36. Since the pointed section is hereby substantially directed towards the bait 15 and the surface of the bait has been tightened by the pin 20, the pointed section can easily penetrate into the bait 15. The rotation of the hook 18 is possible because the bait 15, the holding arm's lower end section and the hook 18 are designed in such a manner that the bait 15 and this end section can be received between the pointed section 32 and the shank 28 of the hook 18. During this introductory progressive threading the tractive force in the snood does not increase so much that this tractive force exceeds the force whereby the holding arm 8 presses the bait 15 against the support side 6. Thus the bait 15 is still in abutment against the support side 6.

Figure 3:
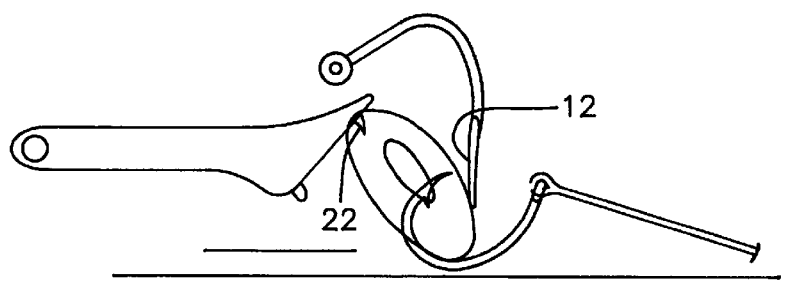
Figure 4:
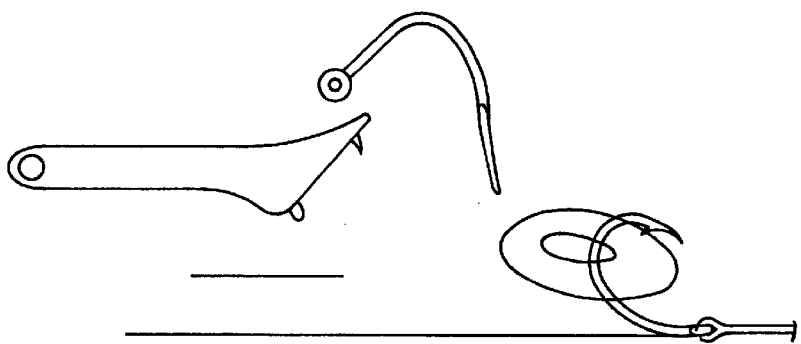

When the force which the hook 18 exerts on the bait 15, i.e. when the tractive force in the snood 24 increases as the hook continues to penetrate the bait, the holding arm 8 is rotated anticlockwise and moved away from the position which is illustrated in FIGS. 1 and 2 to the position which is illustrated in FIG. 3. However, since the spike 22 is still in engagement with the bait 15, the bait 15 is rotated anticlockwise to a greater extent than the holding arm 8. The bait can thereby be passed completely into the bend of the hook and be securely attached thereto.

Thereafter the bait 15 is pulled away from the spike 22, whereupon the bait 15 can pass the holding arm 8. Since the above-mentioned torque thereby ceases, the hook is hereby also rotated back to its original position.

With the baiting machine according to the invention a rotation of the bait 15 and the hook 18 are achieved in a very simple manner and with a minimum of movable parts for guiding the hook and the bait during the baiting. The baiting machine according to the invention is therefore very reliable. Moreover, the production, operating and maintenance costs for this device are low.

In order to achieve the desired rotation of the bait about the first section of the bait holder, it will be understood that instead of a spike any kind of device can be employed for securing the bait, such as a clamping device or the like. The principle requirement is that it should be possible to rotate the bait in the described and illustrated manner when the hook is brought into engagement with the bait.

I claim:

1. A method for baiting fishing hooks on fishing lines by a baiting machine comprising a baiting station, said method comprising:

pulling fishing hooks with an eye, a bend and a pointed section past the baiting station in turn and by a snood on the line which is attached in the eye, threading a bait at a first end section thereof, onto a spike of a stationary section of the baiting station, bringing the hook's point into engagement with a second end section of the bait opposite the first end section during an introductory threading of the hook on to the bait, rotating the bait in a first direction about the spike under the influence of the force exerted on the bait by the hook, while the hook simultaneously continues to be threaded on to the bait, rotating the hook in a direction opposite to the first direction by pulling it off the line, until the bait has been threaded on the bend of the hook, and pulling the bait from the spike.

2. A baiting machine comprising:

a baiting station where fishing hooks with an eye, a shank, a bend and a pointed section can be pulled past the baiting station in turn and by a snood of the line which is attached to the eye, a base on which the shank of the hook can slide, the bend hereby projecting away therefrom, a bait holder with a support side, which faces substantially in the direction of pull and extends from a first section which is located at a distance from the base to a second section which is located close thereto, a holding arm movable in relation to the bait holder with a contact surface which is located on the downstream side of the support side, considered in the hook's direction of movement, and which faces the support side and is resiliently pressed in the direction thereof, and a bait transport device which is arranged to place a bait between and in abutment with the support side and the contact surface in such a manner that the hook's point can be passed through the bait near the support side's second section when the hook is pulled past the baiting station, at the support side's first section the bait holder has a spike for releasably securing the bait, which spike projects out from the support side towards the contact surface, and the holding arm is arranged to resiliently hold the bait in engagement with the spike after the bait has been placed between the support side and the contact surface, wherein said bait is threaded onto said spike.

3. A baiting machine according to claim 2, wherein at the support side's second section the bait holder has a pin which projects out from the support side towards the contact surface, and whose free end is blunt, and the holding arm is arranged to resiliently hold the bait in abutment against the pin after the bait has been placed between the support side and the contact surface.

* * * * *